(12) United States Patent
Obermeier-Hartmann et al.

(10) Patent No.: US 11,046,375 B2
(45) Date of Patent: Jun. 29, 2021

(54) TRACK ROLLER UNIT FOR AN AGRICULTURAL WORKING MACHINE

(71) Applicant: CLAAS Industrietechnik GmbH, Paderborn (DE)

(72) Inventors: Robert Obermeier-Hartmann, Bad Driburg (DE); Sascha Rackow, Paderborn (DE)

(73) Assignee: CLAAS Industrietechnik GmbH, Paderborn (DE)

( * ) Notice: Subject to any disclaimer, the term of this patent is extended or adjusted under 35 U.S.C. 154(b) by 326 days.

(21) Appl. No.: 16/181,645

(22) Filed: Nov. 6, 2018

(65) Prior Publication Data

US 2019/0135356 A1    May 9, 2019

(30) Foreign Application Priority Data

Nov. 8, 2017    (DE) .......................... 102017126103.6

(51) Int. Cl.
| | |
|---|---|
| *B62D 55/112* | (2006.01) |
| *B62D 55/14* | (2006.01) |
| *B62D 55/24* | (2006.01) |
| *B62D 55/30* | (2006.01) |
| *B62D 55/125* | (2006.01) |

(52) U.S. Cl.
CPC ........ *B62D 55/1125* (2013.01); *B62D 55/125* (2013.01); *B62D 55/14* (2013.01); *B62D 55/24* (2013.01); *B62D 55/30* (2013.01); *B62D 55/244* (2013.01); *B62D 55/305* (2013.01)

(58) Field of Classification Search
CPC .......................... B62D 55/1125; B62D 55/104
See application file for complete search history.

(56) References Cited

U.S. PATENT DOCUMENTS

| | | | |
|---|---|---|---|
| 3,602,470 A | 8/1971 | Reynolds | |
| 3,880,446 A | 4/1975 | Mueller | |
| 4,065,143 A | * 12/1977 | Iida ........................ | B60G 17/04 280/43.23 |

(Continued)

FOREIGN PATENT DOCUMENTS

| | | |
|---|---|---|
| DE | 2255348 A1 | 4/1974 |
| GB | 2301569 A | 12/1996 |
| WO | 2011154533 A1 | 12/2011 |

OTHER PUBLICATIONS

European Search Report dated .Mar. 20, 2019 in European Application No. 18201666 with English translation of the relevant parts.

*Primary Examiner* — Tony H Winner
(74) *Attorney, Agent, or Firm* — Collard & Roe, P.C.

(57) ABSTRACT

A track roller unit for an agricultural working machine has at least one first guide roller and one second guide roller. The first guide roller is mounted on a first supporting arm and the second guide roller is mounted on a second supporting arm. At least one support roller is situated between the guide rollers, and a track belt wraps around the guide rollers and the at least one support roller. A hydropneumatic damping element is assigned to at least one guide roller and/or one support roller. At least one regulated restrictor device, which is assigned to a damping element, is provided and is designed in such a way that its flow resistance is adjustable during the operation of the track roller unit.

12 Claims, 2 Drawing Sheets

(56) References Cited

U.S. PATENT DOCUMENTS

| | | | | |
|---|---|---|---|---|
| 4,194,761 A * | 3/1980 | Falk | .................... | B60G 11/185 |
| | | | | 267/284 |
| 4,537,422 A * | 8/1985 | O'Rourke | ............... | F16F 9/365 |
| | | | | 188/297 |
| 9,415,818 B1 * | 8/2016 | Tiede | ................... | B62D 55/104 |
| 2007/0107950 A1 * | 5/2007 | Ki | ......................... | B62D 55/14 |
| | | | | 180/9.5 |
| 2008/0084111 A1 | 4/2008 | Rainer | | |
| 2010/0237574 A1 * | 9/2010 | Allaire | ................ | B62D 55/104 |
| | | | | 280/28.5 |
| 2011/0037312 A1 * | 2/2011 | Geraschenko | ....... | B62D 55/104 |
| | | | | 305/141 |
| 2016/0023695 A1 * | 1/2016 | Obermeier-Hartmann | ................. | |
| | | | | B62D 55/305 |
| | | | | 180/9.54 |

\* cited by examiner

TRACK ROLLER UNIT FOR AN AGRICULTURAL WORKING MACHINE

CROSS REFERENCE TO RELATED APPLICATIONS

This application claims priority under 35 USC 119 of German Patent Application No. 10 2017126103.6, filed on Nov. 8, 2017, the disclosure of which is herein incorporated by reference.

BACKGROUND OF THE INVENTION

The invention relates to a track roller unit of an agricultural working machine, and to an agricultural working machine.

Agricultural working machines, such as tractors or self-propelled harvesting machines, are being designed to be increasingly larger in size and more powerful in order to enable more efficient processing of agricultural fields. In so doing, as the dead weight of the working machines increases, so does the permissible overall weight which must be supported on the ground. A high overall weight often also allows for a high ballasting of the agricultural working machine, which can be situated on the working machine in a variable manner depending on the work to be performed, for example, in order to influence a displacement of the center of gravity of the working machine. In order to preferably avoid a disadvantageous ground compression in this case, the ground contact surface on the ground must be enlarged, wherein, in the case of pneumatic tires, as the ground contact surface increases, so does the diameter of the wheels, whereby the installation space required for the wheels increases.

In order to achieve an enlargement of the ground contact surface without these disadvantages, vehicles comprising track roller units are being utilized to an increasing extent; such vehicles have a larger ground contact surface and, in addition, can make it possible to achieve an improved tractive force on soft ground. The running gears utilized in this case often comprise guide rollers and support rollers which are rigidly situated on a running-gear carriage or chassis, so that the high preloads required for the elastic track belt can be applied. One disadvantage of such rigid mountings, however, is a greatly restricted driving comfort, in particular, on asphalt roads. In addition, the rigid mounting of the track roller units can also induce oscillations of the vehicle, whereby the driving safety can be adversely affected.

A ground drive for agricultural machines comprising elastic belts is known, for example, from WO 2011/154533 A1, wherein a belt-type running gear comprises, in each case, at least two outer guide rollers as well as a drive roller situated between these and above the guide rollers, around the circumference of which an endless belt runs, and at least one support roller which is situated below the drive roller, is suspended in a sprung and/or damped manner, and is utilized for supporting a ground-side belt portion between the two guide rollers. In this case, the outer guide rollers and the at least one support roller are assigned to a swivelably situated carriage which is situated on a swing frame which, in turn, is resiliently connected to a main frame of the land vehicle. The suspension points of the support rollers on the carriage and/or supporting frame of the belt-type running gear and/or of the common swing frame are sprung and/or damped independently of one another, wherein the support frame is supported against a component, which is fixed relative to the frame, of the vehicle via a torque support. This complexly designed type of mounting of the track roller unit requires a great deal of effort to match the individual spring and/or damping elements, and so a great deal of effort is required to adapt the suspension/damping of the track roller unit, for example, to changed ground conditions.

SUMMARY OF THE INVENTION

One problem addressed by the invention is therefore that of providing a track roller unit for an agricultural working machine, which makes it possible to improve the driving comfort and the driving safety.

The problem is solved according to the invention a track roller unit for an agricultural working machine that comprises at least one first guide roller and one second guide roller, wherein the first guide roller is mounted on a first supporting arm and the second guide roller is mounted on a second supporting arm, at least one support roller situated between the guide rollers, and a track belt which wraps around the guide rollers and the at least one support roller. In particular, a hydropneumatic, damping element is assigned to at least one guide roller and/or one support roller. According to the invention, at least one regulated restrictor device, which is assigned to a damping element, is provided and is designed in such a way that its flow resistance is adjustable, in particular, during the operation of the track roller unit. A drive of the track belt takes place in a friction-locking and/or form-locking manner via at least one driven guide roller. A track belt can be an elastic track belt or a chain belt in this case, which can be tensioned, for example, with the aid of a tensioning device. A damping element can be designed in the form of a hydraulic, pneumatic, or hydropneumatic cylinder. A regulated restrictor device can be assigned to at least one damping element of the track roller unit. The regulated restrictor device is designed in such a way that its flow resistance can be changed and/or can be adjusted to a certain value. A regulation or adjustment of the restrictor device can take place, in particular, during the operation of the working machine, i.e., when the track roller unit is at a standstill or while the track roller unit is moving. This makes it possible to change the damping effect of the particular assigned damping element, in particular, during the operation of the working machine, whereby an adaptation of the damping, for example, of build-up vibrations, of the track roller unit to a particular driving condition, different vehicle speeds, and/or load conditions is possible with little effort. A continuous adjustment of the damping is also conceivable, whereby a driving comfort and the driving safety of the agricultural working machine can be further improved.

In one preferred embodiment of the invention, a first damping element is assigned to at least one guide roller and a second damping element is assigned to the at least one support roller, wherein the first damping element and the second damping element are fluidically coupled. Due to the coupling of the first damping element and the second damping element, an improved suspension of the track roller unit, in particular, on uneven ground, can be achieved. Advantageously, a pressure accumulator for a first fluid is provided, which is fluidically connected to at least one, in particular, the first, damping element. The pressure accumulator can be designed, for example, in the form of a diaphragm accumulator and, in particular, can be connected to the first damping element.

In one preferred embodiment of the invention, the regulated restrictor device is situated between the first damping element and the second damping element, in particular, in a connecting line which connects these. As a result, in particular, a damping of the second damping element which can be assigned, for example, to the at least one support roller, can be affected. The restrictor device can be situated, in this case, in a connecting line guiding a fluid, whereby an installation space-optimized arrangement of the restrictor device independent of the damping elements is possible. An arrangement of the restrictor device directly on a damping element or an integration of the restrictor device into a damping element is also conceivable. This would have the advantage that the installation would not be made more complex due to the restrictor device and that an, in particular, integrated, restrictor device would be better protected against environmental influences.

Advantageously, the regulated restrictor device is situated between the first, damping element and the pressure accumulator. The first damping element can be designed in the form of a cylinder in this case, the piston of which is situated so as to be movable between an annular chamber and a piston chamber, each of which is filled with a fluid, in particular the same fluid. In this case, the pressure accumulator can be connected in a fluid-permeable manner to the annular chamber of the first damping element. Due to the arrangement of the regulatable restrictor device between the pressure accumulator and the first damping element, the regulation thereof can affect all downstream damping elements, in particular, the first damping element and the second damping element.

Particularly advantageously, at least one non-return valve is assigned to a damping element and/or a restrictor device. The non-return valve and the restrictor device can be situated in parallel and can be connected to a one way restrictor valve. This is a form of a variable, directional flow resistance. This offers the possibility of adjusting the moving speeds of the damping element separately for the two movement directions, and so a different damping behavior can be set depending on the movement direction. This has the advantage, for example, in the case of a second damping element of the support rollers, that an upward movement is damped to a greater extent via the restrictor device than is the case with a downward restoring movement, in which case a fluid can flow across the non-return valve. This has the advantage of a faster return movement of the support rollers after a ground unevenness.

In one preferred embodiment, a preset directional flow resistance is provided. A preset directional flow resistance has a fixedly preset, non-regulatable flow resistance in this case, which can be designed to differ in the two directions in terms of the level of flow resistance. The preset directional flow resistance can be designed to have multiple parts. The directional flow resistance can be situated between the first damping element and the second damping element in this case. The flow resistance can be integrated into a damping element or can be situated in a fluid line connecting these. Due to this, in particular, preset, directional flow resistance, a normal position, for example, of the damping for reducing oscillations, in particular in the case of a pulsating load, can be made possible.

In one further advantageous embodiment of the invention, the regulated restrictor device is designed in the form of an adjustable restrictor and/or a restrictor valve having an adjustable flow cross-section. Moreover, it is conceivable, depending on the design of the damping elements, that the regulated restrictor device is designed in the form of a metering pin, a restrictor including a longitudinal notch, a slotted throttle, and/or in the form of a gap throttle. By way of the selection of an appropriately suited, regulated restrictor device, a reliable function of the regulated throttling can be ensured.

It is furthermore advantageous that a restrictor device, a preset, directional flow resistance, and/or a non-return valve are/is integrated into a damping element, in particular, the piston thereof. A restrictor device, the preset, directional flow resistance, or the non-return valve can be integrated, for example, into a damping piston or can be integrated, in the form of movable plates, so-called shims, into a damping element. This has the advantage that no additional installation space is required and the environmental influences, which can result in damage to the restrictor device and/or the non-return valve, can be better shielded.

In one further advantageous embodiment of the invention, a control device is provided for the manual and/or automatic adjustment of at least one regulated restrictor device, in particular, during the operation of the track roller unit. This makes it possible to continuously change the damping effect of the particular assigned damping element, in particular, during the operation of the working machine, whereby an adaptation of the damping, for example, of build-up vibrations, of the track roller unit to a particular driving condition, different vehicle speeds, and/or load conditions is possible with little effort.

Advantageously, a regulated restrictor device can be controlled and/or regulated depending on at least one performance parameter in this case. Performance parameters can be, for example, a speed of the working machine, a ballasting, and/or ground conditions such as road or field.

Moreover, the invention relates to an agricultural working machine, in particular a tractor or a self-propelled harvesting machine, comprising at least one track roller unit as described and designed as explained above.

BRIEF DESCRIPTION OF THE DRAWINGS

The invention is explained in greater detail in the following with reference to the attached drawings.

Wherein.

DETAILED DESCRIPTION OF THE EMBODIMENTS

Figure 1:
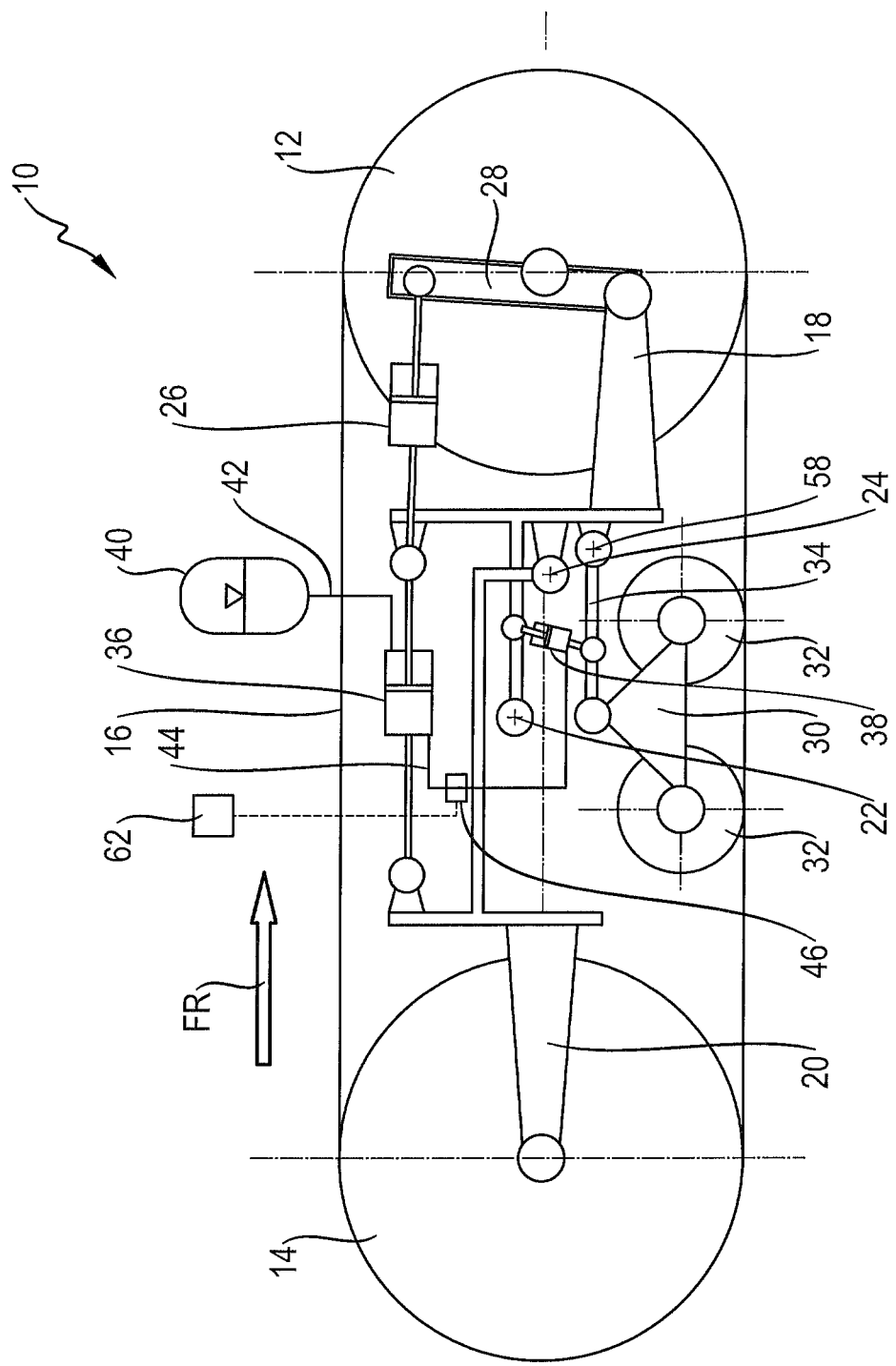
FIG. 1 shows a schematic side view of a traction wheel of a track roller unit of an agricultural working machine, comprising a rubber track belt.

In FIG. 1, a track roller unit 10 of an agricultural working machine, such as a tractor or a self-propelled harvesting machine (not shown), is represented. The design of a tractor of a self-propelled harvesting machine will not be discussed in detail, since this is considered to be known to a person skilled in the art. A working machine within the scope of the invention can also be a construction machine comprising track roller units 10.

The track roller unit 10 comprises a first guide roller 12 and a second guide roller 14, around which an elastic track belt 16, which is made of rubber, for example, continuously runs in order to support the agricultural working machine with respect to the ground. The track belt 16 is driven in this case, for example, by the second guide roller 14. The drive of the track belt 16 takes place, in this case, via a non-positive, in particular, frictional connection radially on the outside between the guide roller 14 and an inner surface of the track belt 16. For lateral guidance, the track belt 16 comprises guide blocks (not represented) arranged on the inside, which can be situated essentially in the center of the track belt 16 and in such a way that they interact with corresponding inner surfaces of the guide rollers 12, 14.

The first guide roller 12, which is located at the front, in the direction of travel, is rotatably mounted on a first supporting arm 18, wherein the first supporting arm 18 is supported thereon so as to be swivelable about a machine axis 22 with respect to the working machine. The second guide roller 14 is rotatably mounted on a second supporting arm 20, wherein the second supporting arm 20 is mounted on the first supporting arm 18 so as to be swivelable about a first swivel axis 24. A tensioning device 26 in the form of a hydraulic cylinder is situated on the first supporting arm 18 and can apply a tensioning force, for tensioning the track belt 16, to a belt tensioning rocker arm 28 which is also situated on the first supporting arm 18. Between the guide rollers 12, 14, two support rollers 32 are rotatably situated on a pendulum 30 for improved support of the working machine with respect to the ground. The pendulum 30 comprising the support rollers 32 is mounted on the first supporting arm 18 via a rocker arm 34 and can swivel about a second swivel axis 58 with respect to the first supporting arm 18. The support rollers 32 rest against the track belt 16, on the inside thereof.

A first damping element 36 is situated between the first supporting arm 18 and the second supporting arm 20, and is connected thereto at the ends thereof. The first damping element 36 provides for a damping of an upwardly directed swivel movement about the machine axis 22 of the first supporting arm 18 located at the front, in the direction of travel FR, for example, during travel over a ground unevenness. A damping of the movement of the support rollers 32 mounted on the pendulum 30 takes place via a second damping element 38. The second damping element 38 is situated between the first supporting arm 20 and the rocker arm 34 in this case and is connected thereto at the ends thereof. The damping elements 36, 38 can be designed in the form of hydraulic and/or hydropneumatic cylinders in this case. By way of the second damping element 38, a swivel movement of the rocker arm 34, at the end of which the pendulum 30 comprising the support rollers 32 is mounted, about the second swivel axis 58 can be supported and damped with respect to the first supporting arm 20. The first damping element 36 and the second damping element 38 are fluidically coupled via a connecting line 44. In this case, for example, during an upward deflection of the first supporting arm 20, fluid from the first damping element 36 can reach the second damping element 38 via the connecting line 44, and so the fluid pressure increases here and a support of the support rollers 32 with respect to the ground is increased. The first damping element 36 is connected via a supply line 42 to a pressure accumulator 40 which, for example, can be designed in the form of a diaphragm accumulator.

According to the invention, a regulated restrictor device 46 is provided, which is situated between the first damping element 36 and the second damping element 38. The restrictor device 46 is designed in such a way that its flow resistance is adjustable, in particular, during the operation of the track roller unit 10. The restrictor device 46 can be assigned to the second damping element 38 and can adjustably regulate its damping behavior, wherein the restrictor device 46 can be situated, for example, in the connecting line 44. The regulated restrictor device 46 can be controlled/regulated via a control device 62, wherein the control device 62 is situated on the working machine-side or can be integrated into a working machine-side control device (not represented).

Figure 2:
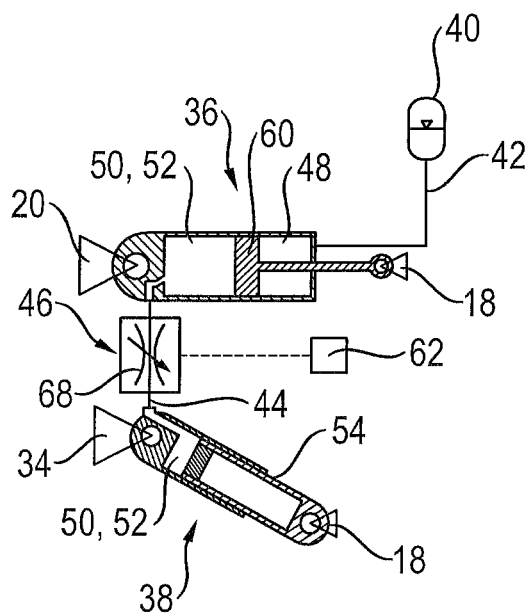
FIG. 2 shows a schematic representation of a first damping element and a second damping element having a regulated restrictor device situated therebetween.

FIG. 2 shows a detailed representation of the arrangement of the first damping element 36 and the second damping element 38 comprising the regulated restrictor device 46 which is situated in the connecting line 44. The first damping element 36 is connected, at the ends thereof, to the first supporting arm 18 and to the second supporting arm 20, whereas the second damping element 38 is connected, at the ends thereof, to the first supporting arm 18 and to the rocker arm 34 of the support rollers. The first damping element 36 is fluidically connected to the pressure accumulator 40 via the supply line 42, wherein the supply line 42 is connected to an annular chamber 48 of the first damping element 36. The first damping element 36 also comprises a piston chamber 50 which is separated from the annular chamber 48 by a movable piston 60. A first fluid 52 is present in the pressure accumulator 40 and in the piston chamber 50, which also enters a piston chamber 50 of the second damping element 38 via the connecting line 44. The second damping element 38 is designed in the form of a hydropneumatic damper and comprises a compressible second fluid 54 in a closed volume. The regulated restrictor device 46 is designed in the form of a restrictor valve 68 and can be adjusted and/or regulated via a control device 62 also during the operation of the working machine or the track roller unit 10.

Figure 3:
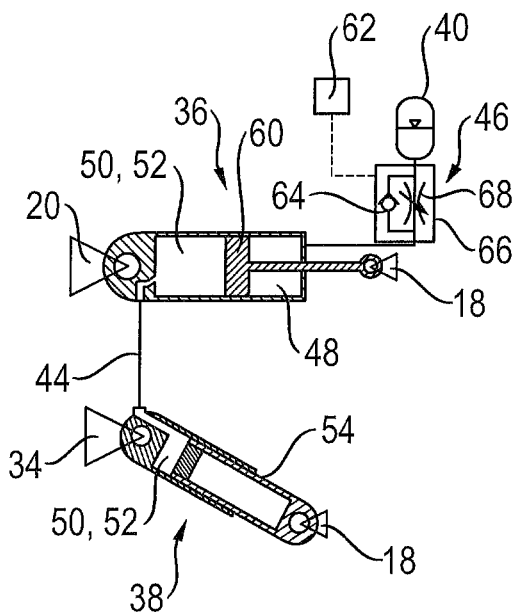
FIG. 3 shows a schematic representation of two damping elements comprising a one way restrictor valve between the first damping element and the pressure accumulator.

In an alternative embodiment (FIG. 3), a regulated restrictor device 46 assigned to the first damping element 36 is situated in the supply line 42 between the pressure accumulator 40 and the annular chamber 48 of the first damping element 36. The regulated restrictor device 46 comprises a restrictor valve 68 as well as a non-return valve 64 situated in parallel thereto. The regulated restrictor device 46 is connected to a regulated one way restrictor valve 66 in this case, which has directionally different flow resistances and, therefore, different dampings. The allows, for example, for a damped evasive maneuver of the first supporting arm 20 and, via the non-return valve 64, an essentially undamped, faster restoring movement. This has the advantage that the guide rollers 12, 14 and support rollers 32 can better follow a ground contour, whereby handling characteristics of the working machine can be improved.

Figure 4:
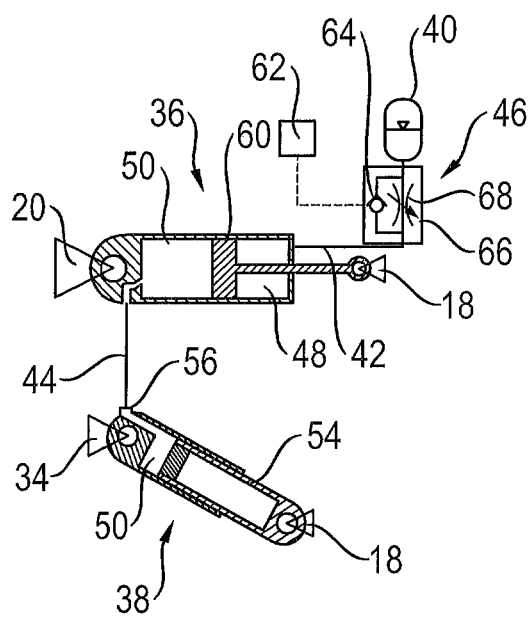
FIG. 4 shows a schematic representation of the damping elements in FIG. 3 including an additional directional flow resistance.
Figure 5:
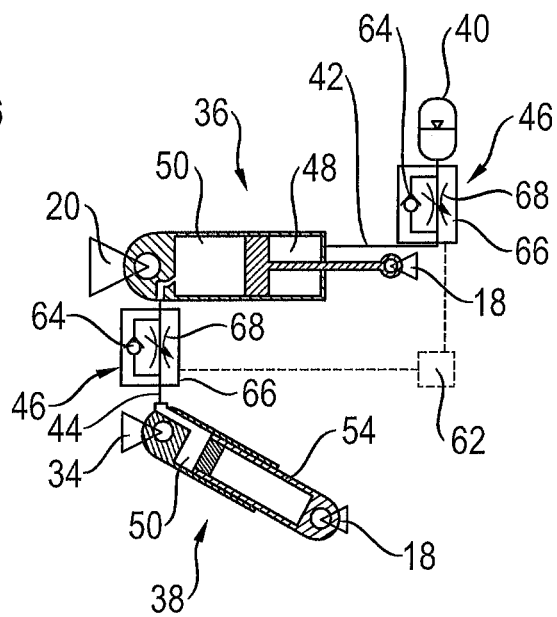
FIG. 5 shows a schematic representation of the damping elements in FIG. 3 including an additional one way restrictor valve.

The arrangement of the first damping element 36 and the second damping element 38 represented in FIG. 4 comprises, in addition to the regulated restrictor device 46 in the supply line 42, a directional flow resistance 56 between the first damping element 36 and the second damping element 38. The directional flow resistance 56 is integrated into the second damping element 38 on the piston chamber-side and allows for directional damping. The directional flow resistance 56 can be regulated in this case or can be preset, for example, with flow resistances defined according to direction. In FIG. 5, as compared to FIG. 3, one further restrictor device 46 in the form of a one way restrictor valve 66 is situated between the two damping elements 36, 38, including a non-return valve 64 and a restrictor valve 68 connected in parallel.

The regulated restrictor devices 46 and/or directional flow resistances 56 can also be integrated into one or multiple damping elements 36, 38, for example, in the form of damping pistons and/or plate-shaped non-return valves, so-called shims.

It is within the ability of one skilled in the art to modify the exemplary embodiment described in a manner not shown, or to use it in other machine systems to obtain the effects described, without departing from the scope of the present invention.

LIST OF REFERENCE CHARACTERS

10 track roller unit
12 first guide roller
14 second guide roller
16 track belt
18 first supporting arm
20 second supporting arm
22 machine axis
24 first swivel axis
26 tensioning device
28 belt tensioning rocker arm
30 pendulum
32 support roller
34 rocker arm
36 first damping element
38 second damping element
40 pressure reservoir
42 supply line
44 connecting line
46 regulated restrictor device
48 annular chamber
50 piston chamber
52 first fluid
54 second fluid
56 flow resistance
58 second swivel axis
60 piston
62 control device
64 non-return valve
66 one way restrictor valve
68 restrictor valve
FR direction of travel

What is claimed is:

1. A track roller unit for an agricultural working machine, comprising:
    at least one first guide roller mounted on a first supporting arm;
    at least one second guide roller mounted on a second supporting arm,
    at least one support roller situated between the at least one first guide roller and the at least one second guide roller,
    a track belt wrapped around the at least one first/second guide rollers and the at least one support roller,
    at least one hydropneumatic damping element, the at least one hydropneumatic damping element being assigned to at least one of the at least one first/second guide rollers or the at least one support roller, and
    at least one regulated restrictor device, which is assigned to the at least one hydropneumatic damping element, the at least one regulated restrictor device being designed to have an adjustable flow resistance during the operation of the track roller unit.

2. The track roller unit as claimed in claim 1, wherein the at least one hydropneumatic damping element includes first and second damping elements, the first damping element is assigned to at least one of the at least first/second guide rollers, and the second damping element is assigned to the at least one support roller, wherein the first damping element and the second damping element are fluidically coupled.

3. The track roller unit as claimed in claim 2, wherein the regulated restrictor device is situated between the first damping element and a pressure accumulator.

4. The track roller unit as claimed in claim 2, wherein the regulated restrictor device is situated in a connecting line between the first damping element and the second damping element.

5. The track roller unit as claimed in claim 1, further comprising a pressure accumulator for a first fluid, the pressure accumulator being fluidically connected to the at least one damping element.

6. The track roller unit as claimed in claim 1, further comprising at least one non-return valve assigned to the at least one damping element or regulated restrictor device.

7. The track roller unit as claimed in claim 1, further comprising a preset directional flow resistance.

8. The track roller unit as claimed in claim 1, wherein the regulated restrictor device is designed in the form of an adjustable restrictor or a restrictor valve having an adjustable flow cross-section.

9. The track roller unit as claimed in claim 1, wherein the regulated restrictor device, a preset, directional flow resistance, or a non-return valve are/is integrated into a piston of the at least one hydropneumatic damping element.

10. The track roller unit as claimed claim 1, further comprising a control device configured for the manual or automatic adjustment of the at least one regulated restrictor device during the operation of the track roller unit.

11. The track roller unit as claimed in claim 10, wherein the control device is configured for controlling or regulating the regulated restrictor device depending on at least one performance parameter.

12. An agricultural working machine comprising at least one track roller unit as claimed in claim 1.

* * * * *